US010343931B2

(12) United States Patent
Dani et al.

(10) Patent No.: US 10,343,931 B2
(45) Date of Patent: Jul. 9, 2019

(54) FILTER CARTRIDGE PLACEMENT IN FILTER AS YOU POUR SYSTEM

(71) Applicant: Brita LP, Oakland, CA (US)

(72) Inventors: Nikhil P. Dani, Pleasanton, CA (US); Edward B. Rinker, Pleasanton, CA (US); Russell Bell, Pleasanton, CA (US)

(73) Assignee: Brita LP, Oakland, CA (US)

( * ) Notice: Subject to any disclaimer, the term of this patent is extended or adjusted under 35 U.S.C. 154(b) by 0 days.

(21) Appl. No.: 15/756,809

(22) PCT Filed: Sep. 27, 2016

(86) PCT No.: PCT/IB2016/001474
§ 371 (c)(1),
(2) Date: Mar. 1, 2018

(87) PCT Pub. No.: WO2017/055915
PCT Pub. Date: Apr. 6, 2017

(65) Prior Publication Data
US 2018/0319672 A1    Nov. 8, 2018

Related U.S. Application Data

(60) Provisional application No. 62/235,321, filed on Sep. 30, 2015.

(51) Int. Cl.
*C02F 1/00* (2006.01)
*B01D 29/11* (2006.01)
(Continued)

(52) U.S. Cl.
CPC ............ *C02F 1/003* (2013.01); *B01D 29/114* (2013.01); *B01D 35/30* (2013.01); *B01D 35/143* (2013.01);
(Continued)

(58) Field of Classification Search
CPC ........ C02F 1/003; B01D 29/114; B01D 35/30
See application file for complete search history.

(56) References Cited

U.S. PATENT DOCUMENTS 313,320 A    3/1885    Goodale
619,569 A    2/1899    Hewel
(Continued)

FOREIGN PATENT DOCUMENTS

CA    2051056 C    9/1998
CA    2559637 A1    3/2007
(Continued)

OTHER PUBLICATIONS

CamelBak: "CamelBak Relay Water Pitcher," published Jan. 22, 2014, p. 1, XP054977371. Retrieved from Internet: URL: https://www.youtube.com/watch?v=01TdZCF8AqY [retrieved on May 18, 2017].
(Continued)

*Primary Examiner* — Chester T Barry
(74) *Attorney, Agent, or Firm* — Thomas C. Feix

(57) ABSTRACT

In one example, a fluid container includes a reservoir that includes a reservoir wall. A cover is configured to engage the reservoir, and the cover includes a spout configured and arranged for fluid communication with the reservoir, and the spout is disposed at one end of the cover. The fluid container also includes a filter cage configured to releasably engage the cover in a location near the spout. When the filter cage is engaged with the cover, and the cover is disposed on the reservoir, a small gap is defined between the front of the spout and the front of the filter cage.

16 Claims, 5 Drawing Sheets

(51) Int. Cl.
  *B01D 35/30* (2006.01)
  *B01D 35/143* (2006.01)
(52) U.S. Cl.
  CPC .... *B01D 2201/28* (2013.01); *C02F 2209/445* (2013.01); *C02F 2307/04* (2013.01)

(56) References Cited

U.S. PATENT DOCUMENTS

| | | |
|---|---|---|
| 1,074,168 A | 9/1913 | Feinstein |
| 2,689,048 A | 9/1954 | Powers |
| 3,016,984 A | 1/1962 | Getzin |
| 3,497,069 A | 2/1970 | Lindenthal et al. |
| 3,535,852 A | 10/1970 | Hirs |
| 3,554,377 A | 1/1971 | Miller |
| 3,662,780 A | 5/1972 | Marsh |
| 4,066,551 A | 1/1978 | Stern |
| 4,096,742 A | 6/1978 | Musolf et al. |
| 4,154,688 A | 5/1979 | Pall |
| 4,259,096 A | 3/1981 | Nakamura et al. |
| 4,514,302 A | 4/1985 | van Zon et al. |
| 4,605,499 A | 8/1986 | Wise |
| 4,613,438 A | 9/1986 | DeGraffenreid |
| 4,696,742 A | 9/1987 | Shimazaki |
| 4,764,274 A | 8/1988 | Miller |
| 4,921,600 A | 5/1990 | Meissner |
| 4,948,499 A | 8/1990 | Peranio |
| 4,983,288 A | 1/1991 | Karbachsch et al. |
| 5,061,367 A | 10/1991 | Hatch et al. |
| 5,076,922 A | 12/1991 | DeAre |
| 5,106,501 A | 4/1992 | Yang et al. |
| 5,122,270 A | 6/1992 | Ruger et al. |
| 5,202,183 A | 4/1993 | Hosako et al. |
| 5,225,078 A | 7/1993 | Polasky et al. |
| 5,518,620 A | 5/1996 | Eguchi et al. |
| 5,595,659 A | 1/1997 | Huang et al. |
| 5,609,759 A | 3/1997 | Nohren, Jr. et al. |
| 5,681,463 A | 10/1997 | Shimizu et al. |
| 5,736,045 A | 4/1998 | Bies et al. |
| 5,904,854 A | 5/1999 | Shmidt et al. |
| 5,919,365 A | 7/1999 | Collette |
| 5,951,854 A | 9/1999 | Goldberg et al. |
| 5,980,743 A | 11/1999 | Bairischer |
| 6,004,460 A | 12/1999 | Palmer et al. |
| 6,189,436 B1 | 2/2001 | Brooks |
| 6,193,886 B1 | 2/2001 | Nohren, Jr. |
| 6,257,242 B1 | 7/2001 | Stavridis |
| 6,368,506 B1 | 4/2002 | Gebert et al. |
| 6,383,381 B1 | 5/2002 | O'Flynn et al. |
| 6,435,209 B1 | 8/2002 | Heil |
| 6,475,386 B1 | 11/2002 | Carr et al. |
| 6,550,622 B2 | 4/2003 | Koslow |
| 6,565,743 B1 | 5/2003 | Poirier et al. |
| 6,569,329 B1 | 5/2003 | Nohren, Jr. |
| 6,589,904 B1 | 7/2003 | Iwasaki et al. |
| 6,599,427 B2 | 7/2003 | Nohren et al. |
| 6,733,669 B1 | 5/2004 | Crick |
| 7,160,369 B2 | 1/2007 | von Blucher et al. |
| 7,473,362 B1 | 1/2009 | Nohren, Jr. |
| 7,828,969 B2 | 11/2010 | Eaton et al. |
| 8,051,989 B1 | 11/2011 | Tondreau |
| 8,080,160 B2 | 12/2011 | Yanou et al. |
| 8,133,525 B2 | 3/2012 | Skalski et al. |
| 8,221,567 B2 | 7/2012 | Tate et al. |
| 8,221,811 B2 | 7/2012 | Skalski et al. |
| 8,419,818 B2 | 4/2013 | Page |
| 9,045,353 B2 | 6/2015 | Parekh et al. |
| 9,511,315 B2 | 12/2016 | Cur et al. |
| 10,035,713 B2 | 7/2018 | Dani et al. |
| 2001/0035094 A1 | 11/2001 | Takagaki et al. |
| 2002/0020673 A1 | 2/2002 | Nohren et al. |
| 2002/0060176 A1 | 5/2002 | Mierau et al. |
| 2002/0066700 A1 | 6/2002 | Dolfel et al. |
| 2002/0083841 A1 | 7/2002 | Chaouachi et al. |
| 2002/0166811 A1 | 11/2002 | Walker et al. |
| 2004/0060858 A1* | 4/2004 | Lucas ................ B01D 29/21 210/338 |
| 2005/0279768 A1 | 12/2005 | Chatrath |
| 2006/0049096 A1 | 3/2006 | Bassett et al. |
| 2006/0144781 A1 | 7/2006 | Carlson et al. |
| 2007/0007296 A1 | 1/2007 | Guyot |
| 2007/0095758 A1 | 5/2007 | Bortun et al. |
| 2008/0128364 A1 | 6/2008 | Cloud et al. |
| 2008/0274312 A1 | 11/2008 | Schelling et al. |
| 2009/0039028 A1 | 2/2009 | Eaton et al. |
| 2009/0139926 A1 | 6/2009 | Hassebrauck |
| 2009/0166295 A1 | 7/2009 | Chen et al. |
| 2009/0184042 A1 | 7/2009 | Steed et al. |
| 2010/0170639 A1 | 7/2010 | Kohl |
| 2010/0170839 A1 | 7/2010 | Kohl |
| 2010/0219151 A1 | 9/2010 | Risheq |
| 2010/0266351 A1 | 10/2010 | Vogel et al. |
| 2010/0282682 A1 | 11/2010 | Eaton et al. |
| 2011/0079551 A1 | 4/2011 | Olson et al. |
| 2011/0079572 A1 | 4/2011 | Olson et al. |
| 2011/0247975 A1 | 10/2011 | Rapparini |
| 2011/0278216 A1 | 11/2011 | Hull et al. |
| 2011/0303589 A1 | 12/2011 | Kuennen et al. |
| 2011/0305801 A1 | 12/2011 | Beer |
| 2012/0017766 A1 | 1/2012 | Anson et al. |
| 2012/0055862 A1 | 3/2012 | Parekh et al. |
| 2012/0061312 A1 | 3/2012 | Busick et al. |
| 2012/0187036 A1 | 7/2012 | Risheq |
| 2012/0193282 A1 | 8/2012 | Wolf et al. |
| 2012/0214375 A1 | 8/2012 | Kitano et al. |
| 2012/0255890 A1 | 10/2012 | Cumberland |
| 2012/0292247 A1 | 11/2012 | Moon et al. |
| 2012/0298614 A1 | 11/2012 | Nelson |
| 2012/0325735 A1 | 12/2012 | Dicks et al. |
| 2013/0037481 A1 | 2/2013 | Lalouch et al. |
| 2013/0095212 A1 | 4/2013 | Beer |
| 2013/0125748 A1 | 5/2013 | Taylor et al. |
| 2013/0156897 A1 | 6/2013 | Goldstein |
| 2013/0175228 A1 | 7/2013 | Utsch et al. |
| 2013/0195740 A1 | 8/2013 | Li et al. |
| 2013/0199989 A1 | 8/2013 | Carter et al. |
| 2013/0233890 A1 | 9/2013 | Melzer |
| 2013/0319927 A1 | 12/2013 | Lin |
| 2014/0008276 A1 | 1/2014 | Ishikawa et al. |
| 2014/0014566 A1 | 1/2014 | Mitchell |
| 2014/0151275 A1 | 6/2014 | Bradford et al. |
| 2014/0151284 A1 | 6/2014 | Cur et al. |
| 2014/0151285 A1 | 6/2014 | Cur et al. |
| 2014/0151304 A1 | 6/2014 | Bradford et al. |
| 2014/0175005 A1 | 6/2014 | Bradford et al. |
| 2015/0076050 A1* | 3/2015 | May ................ B01D 35/02 210/232 |
| 2015/0166364 A1 | 6/2015 | Wiegele |
| 2016/0167980 A1 | 6/2016 | Dani et al. |
| 2016/0256359 A1* | 9/2016 | Trawick ............... A61J 9/085 |
| 2016/0376161 A1 | 12/2016 | Dani et al. |
| 2016/0376162 A1 | 12/2016 | Dani et al. |
| 2016/0376163 A1 | 12/2016 | Dani et al. |
| 2016/0376164 A1 | 12/2016 | Dani et al. |
| 2016/0376165 A1 | 12/2016 | Dani et al. |
| 2017/0001880 A1 | 1/2017 | Dani et al. |

FOREIGN PATENT DOCUMENTS

| | | |
|---|---|---|
| CA | 2874153 A1 | 6/2015 |
| CA | 2933185 A1 | 6/2015 |
| EP | 0402661 A1 | 12/1990 |
| EP | 0617951 A2 | 10/1994 |
| GB | 2268680 A | 1/1994 |
| GB | 2280596 A | 2/1995 |
| GB | 2284563 A | 6/1995 |
| JP | 657489 U | 8/1994 |
| WO | WO199835738 A1 | 8/1998 |
| WO | WO200701468 A1 | 1/2000 |
| WO | 200071468 A1 | 11/2000 |
| WO | 2011145640 A1 | 11/2011 |
| WO | 2012031853 A1 | 3/2012 |
| WO | 2012150506 A2 | 11/2012 |
| WO | 2013044079 A1 | 3/2013 |

(56) References Cited

FOREIGN PATENT DOCUMENTS

| WO | 2013088260 A1 | 6/2013 |
|---|---|---|
| WO | 2014089207 A1 | 6/2014 |
| WO | WO2015073144 A1 | 5/2015 |
| WO | WO2015094741 A1 | 6/2015 |
| WO | 2017055914 A1 | 4/2017 |
| WO | 2017055915 A1 | 4/2017 |
| WO | 2017055916 A1 | 4/2017 |
| WO | 2017055918 A1 | 4/2017 |

OTHER PUBLICATIONS

International Preliminary Report on Patentability dated Apr. 3, 2018 in corresponding/related International Application No. PCT/IB2016/001472.
International Preliminary Report on Patentability dated Apr. 3, 2018 in corresponding/related International Application No. PCT/IB2016/001474.
International Preliminary Report on Patentability dated Apr. 3, 2018 in corresponding/related International Application No. PCT/IB2016/001479.
International Preliminary Report on Patentability dated Apr. 3, 2018 in corresponding/related International Application No. PCT/IB2016/001495.
International Search Report and Written Opinion dated Feb. 6, 2017 in corresponding/related International Application No. PCT/IB2016/001472.
International Search Report and Written Opinion dated Jan. 26, 2017 in corresponding/related International Application No. PCT/IB2016/001474.
International Search Report and Written Opinion dated Jan. 27, 2017 in corresponding/related International Application No. PCT/IB2016/001479.
International Search Report and Written Opinion dated Jan. 27, 2017 in corresponding/related International Application No. PCT/IB2016/001495.
NPL-1 ( "Activated Carbon Filter Bags", Filterek) Date: Jun. 4, 2012.
Oxford Dictionary Definition—coextensive, 2017, 1 page.
Oxford Dictionary Definition—immediately, 2017, 1 page.
Supplementary European Search Report EP 14870910.8, dated Jun. 8, 2017.
Supplementary European Search Report EP 14871227.6, dated Jun. 8, 2017.
Supplementary European Search Report EP 14871467.8, dated Jun. 8, 2017.
Supplementary European Search Report EP 14871701.0 dated Jun. 8, 2017.
Supplementary European Search Report EP 14871914.9, dated Jun. 13, 2017.
Supplementary European Search Report EP 14872175.6, dated Jun. 8, 2017.
Australian Office Action dated Feb. 22, 2018 in corresponding/related Australian Application No. 2014366927.
Australian Office Action dated Mar. 8, 2018 in corresponding/related Australian Application No. 2014366937.
Australian Office Action dated May 25, 2018 in corresponding/related Australian Application No. 2014366492.
Australian Office Action dated Jun. 22, 2018 in corresponding/related Australian Application No. 2014366926.
Australian Office Action dated Dec. 20, 2018 in corresponding/related Australian Application No. 2014366927.
Supplementary European Search Report EP 14871467,8, dated May 31, 2017.
Supplementary European Search Report EP 14871227.6, dated May 31, 2017.
CamelBak: "CamelBak Relay Water Pitcher," published Jan. 22, 2014, p. 1, XP054977371, Retrieved from the Internet: URL: https://www.youtube.com/watch?v=01TdZCF8AV [retrieved on May 18, 2017].
Hutton, I.M., 2007, Handbook of Nonwoven Filter Media (1st ed), pp. 96-99.
Office Action dated Mar. 4, 2019 in corresponding/related Australian Application No. 2014366937.

\* cited by examiner

FILTER CARTRIDGE PLACEMENT IN FILTER AS YOU POUR SYSTEM

CROSS-REFERENCE TO RELATED APPLICATIONS

This application is the National Stage of International Application No. PCT/IB2016/001474, filed Sep. 27, 2016, which claims the benefit under 35 U.S.C. 119(e) application claims the benefit of U.S. Provisional Application No. 62/235,321, filed Sep. 30, 2015. The disclosure of each of the above applications is incorporated by reference in its entirety. This application is also related to the following United States Patent Applications: U.S. patent application Ser. No. 15/756,713, entitled ACTIVATED CARBON FIBER FILTER MEDIA LAMINATE, which is the National Stage of International Application No. PCT/IB2016/001472, filed Sep. 27, 2016, which claims the benefit under 35 U.S.C. 119(e) of U.S. Provisional Application No. 62/235,289, filed Sep. 30, 2015; U.S. patent application Ser. No. 15/756,747, entitled FILTER CORE CONFIGURATION, which is the National Stage of International Application No. PCT/IB2016/001495, filed Sep. 27, 2016, which claims the benefit under 35 U.S.C. 119(e) of U.S. Provisional Application No. 62/235,295, filed Sep. 30, 2015; and U.S. patent application Ser. No. 15/756,768, entitled FILTER DESIGN WITH INTERCHANGEABLE CORE COVER which is the National Stage of International Application No. PCT/IB2016/001479, filed Sep. 27, 2016, which claims the benefit under 35 U.S.C. 119(e) of U.S. Provisional Application No. 62/235,304, filed Sep. 30, 2015. All of the aforementioned applications are filed the same day herewith, and are incorporated herein in their respective entireties by this reference.

FIELD OF THE INVENTION

Embodiments of the present invention generally concern water filtration systems for pitchers and other fluid containers. More particularly, embodiments of the invention relate to the placement of a filter core cartridge in a fluid container. At least some embodiments can be employed in a filter-as-you-pour (FAYP) system.

BACKGROUND

Water filtration has become common in homes, offices and other places to produce cleaner and better tasting water. Accordingly, water containers such as pitchers have been equipped with filtration systems. In some instances, these filtration systems may employ a filter core through which water passes as a reservoir of the water container is filled. The filtered water than can be dispensed from the reservoir. This design approach has proven problematic however and attention has accordingly shifted to other designs, such as filter-as-you-pour (FAYP) configurations.

In general, FAYP devices are configured with a reservoir that holds a volume of unfiltered fluid. The fluid passes through the filter as it is dispensed from the reservoir. This configuration is an improvement on earlier designs in some respects, but at least some FAYP devices nonetheless present some problems.

For example, some FAYP devices are configured in such a way that a significant amount of fluid in the reservoir can bypass the filter as the fluid is dispensed from the reservoir. This can occur because the fluid pathway between the filter and the outlet of the reservoir is not closed, or at least is not substantially closed. This fluid pathway configuration can arise due to the placement of the filter in the reservoir. In particular, the filter may be located in a location in the reservoir that is spaced well away from the outlet, such as about midway between opposing walls of the reservoir. Because the fluid pathway between the filter and the outlet is not closed, fluid from the reservoir can readily bypass the filter and exit the reservoir.

This problem can be appreciated by considering a substantially full fluid container disposed in a nearly horizontal dispensing position, where the filter is located approximately midway between opposing walls of the reservoir, and where the outlet of the reservoir is located on or near the lowermost wall of the reservoir. Thus, the walls of the reservoir and the filter are all generally horizontal in their orientation. In this circumstance, about half or more of the fluid in the reservoir resides in the space between the filter and the outlet and thus can readily pass through the outlet without first passing through the filter. Moreover, while fluid located in the space between the uppermost wall of the reservoir and the filter may possibly pass through the filter prior to exiting through the outlet, the open path between the filter and the outlet allows the possibility that filtered water can mix with unfiltered water prior to being dispensed from the reservoir.

This problem may become more acute in circumstances where the reservoir is less than full. For example, and depending upon the fullness of the reservoir, it may be the case that when the reservoir is tipped to a nearly horizontal, or other, dispensing position, all or nearly all of the fluid in the reservoir resides in the space between the filter and the outlet and thus can readily pass through the outlet without first passing through the filter. In this circumstance, little or no filtration occurs as fluid is dispensed from the reservoir. As with the other problems noted above, such result leads to a poor experience for the consumer.

A related problem concerns the fluid resistance offered by the filter. The filter, by its nature, tends to provide some resistance to flow through the filter. Thus, from this perspective at least, the filter can be considered to act as a flow restrictor. However, the fluid in the reservoir will tend to follow the path of least resistance when exiting the reservoir and as such, that fluid will tend to pass around the filter rather than through the filter.

Finally, the location of the filter and the fluid resistance offered by the filter have at least one other unfavorable implication. In particular, and with reference again to the example circumstance where a substantially full fluid container is in a generally horizontal position, the filter may be located about mid-depth in the fluid. Because the hydrostatic pressure of the fluid varies from a maximum at the bottom of the fluid to a minimum at the surface of the fluid, the hydrostatic pressure of the fluid just above the filter is significantly less than the maximum hydrostatic pressure. As a result, the flow rate through the filter, which is a function of the hydrostatic pressure of the fluid above the filter, is significantly compromised.

In light of problems such as those noted above, it would be useful to provide a fluid container configured to define a closed, or substantially closed, fluid pathway between a filter and a reservoir outlet. Further, it would be useful to provide a fluid container configured to implement any one or more of reduction or minimization of the amount of unfiltered water left in the fluid container after a dispensing event, reduction or substantial elimination of bypass around the filter, and achievement of relatively higher flow rates based on hydrostatic pressure at the filter. As well, it would be useful to provide a fluid container configured such that the filter is located relatively close to the outlet of the container. Finally, it would be useful to provide a fluid container configured to enable placement of a filter relatively close to the side of the fluid container where the outlet is located. Any of the aforementioned containers could take the form of a filter-as-you-pour container.

ASPECTS OF AN EXAMPLE EMBODIMENT

One or more embodiments within the scope of the invention may be effective in overcoming one or more of the disadvantages in the art, although it is not required that any embodiment resolve any particular problem(s). One example embodiment is directed to a filter-as-you-pour (FAYP) fluid container having a filter and spout configured and arranged such that a fluid pathway between the filter and the spout is closed, or substantially closed. The filter resides in a cage that is removably attached to a lid or other portion of the fluid container. As well, the fluid container includes a reservoir configured and arranged such that the filter is disposed in the reservoir and located relatively close to the wall of the reservoir. In one particular embodiment, the filter is oriented to be generally parallel to the wall, which may be non-vertical, and is arranged such that there is a gap between the front edge of the spout and the front edge of the filter cage whose width is in the range of about 2.0 mm to about 20 mm.

In this example, the filter includes a filter core that is configured and arranged so that a filter medium, which may take the form of a laminate, is securely attached to the filter core without the use of glue. One example of such a filter medium is a laminate that includes a layer of activated carbon fiber (ACF) media positioned between two layers of non-woven material which are arranged so that when the laminate is wrapped around the filter core, one of the non-woven layers is an inner layer, and the other non-woven layer is an outer layer. Each side of the non-woven layers may include an adhesive layer or adhesive material so that the non-woven layers can achieve and maintain substantial contact with the ACF layer, and with each other.

The foregoing embodiment is provided solely by way of example and is not intended to limit the scope of the invention in any way. Consistently, various other embodiments of fluid containers, filter assemblies, and associated filter medium and filter cores, within the scope of the invention are disclosed herein.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Reference will now be made in detail to aspects of various embodiments of the present disclosure, examples of which are illustrated in the accompanying drawings. While described in conjunction with these embodiments, it will be understood that they are not intended to limit the disclosure to these embodiments.

In general, embodiments of the invention can be employed in connection with devices, such as fluid containers, where there is a need to filter fluid as the fluid is dispensed from the container. In one particular example, embodiments of the invention can be used in conjunction with a pitcher, although the scope of the invention is not limited to this example environment and extends, more generally, to any environment where such embodiments can be usefully employed. For example, embodiments of the invention can be employed with any water, or other fluid, container, examples of which include, but are not limited to, bottles, carafes, and jugs.

A. Example Fluid Container

Figure 1:
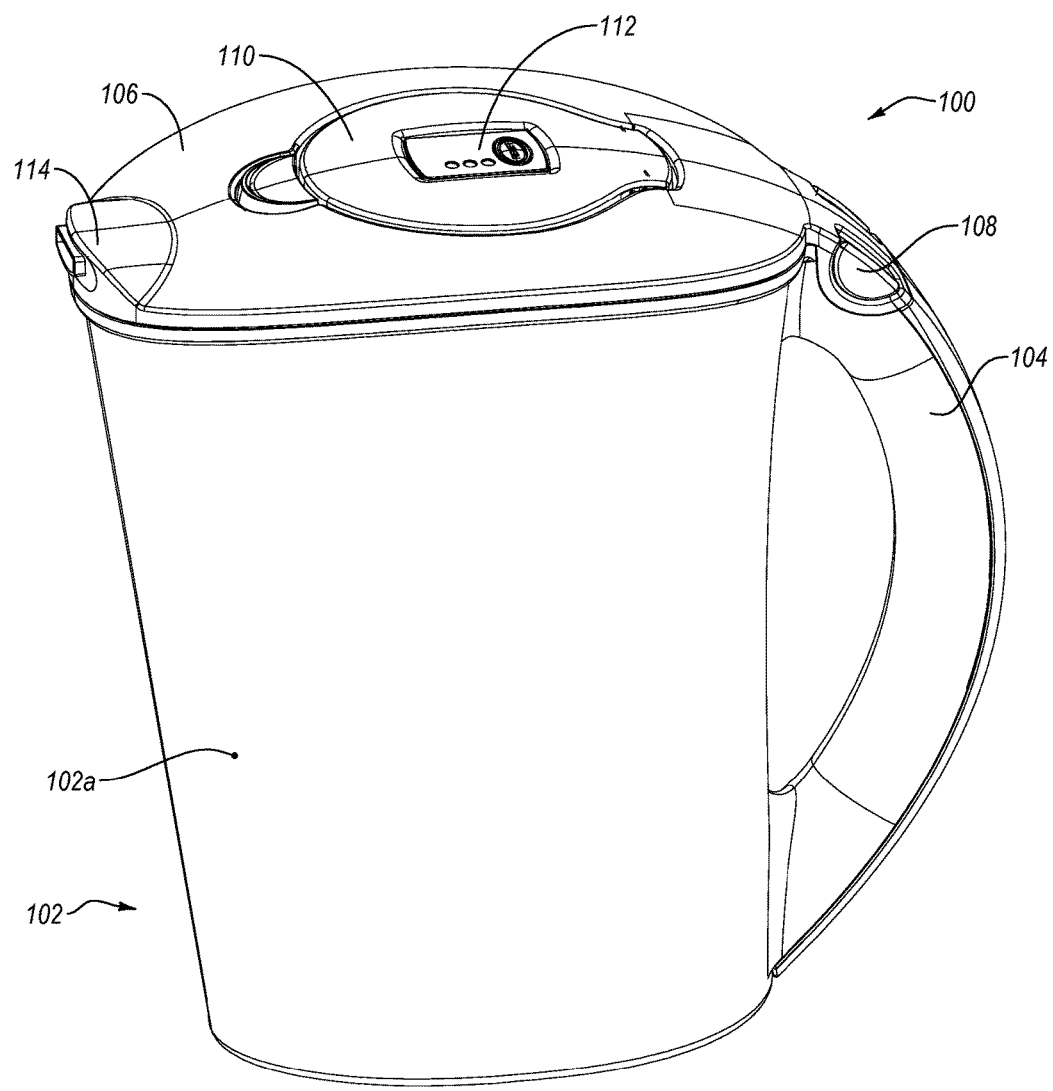
FIG. 1 is a top perspective view of an example embodiment of a fluid container.

Directing attention now to FIG. 1, details are provided concerning a fluid container, one example of which is denoted generally at 100. In at least some embodiments, the fluid container 100 has a filter-as-you-pour configuration in which unfiltered fluid, such as unfiltered water for example, passes through a filter during a fluid dispensing process.

In general, the fluid container 100 can include a reservoir 102 having a wall 102a that may be substantially formed as a unified single-piece structure. A handle 104 attached to the reservoir 102 enables a user to readily pick up the fluid container 100 and dispense fluid from the reservoir 102. The fluid container 100 further includes a removable cover 106 that fits onto, and substantially covers, the top of the reservoir 102. The cover 106 is rotatably connected to the handle 104 by a hinge 108.

The cover 106 includes a lid 110 that is rotatably connected to the body of the cover 106 and that covers a fill opening 106a of the cover 106. The lid 110 can include electronics 112, such as visual indicators, accelerometers, counters and/or other electronic devices that can perform functions such as tracking the number of times that the lid 110 has been opened, such as in connection with a fill operation for example, and indicating to a user when a filter (see, e.g., FIGS. 2-5) should be replaced. Finally, the cover 106 includes a spout 114, or other outlet, that is configured and arranged for fluid communication with the interior of the reservoir 102 so that fluid in the reservoir 102 can exit the fluid container 100 by way of the spout 114.

B. Example Filter Assembly and Filter Cage

Figure 2:
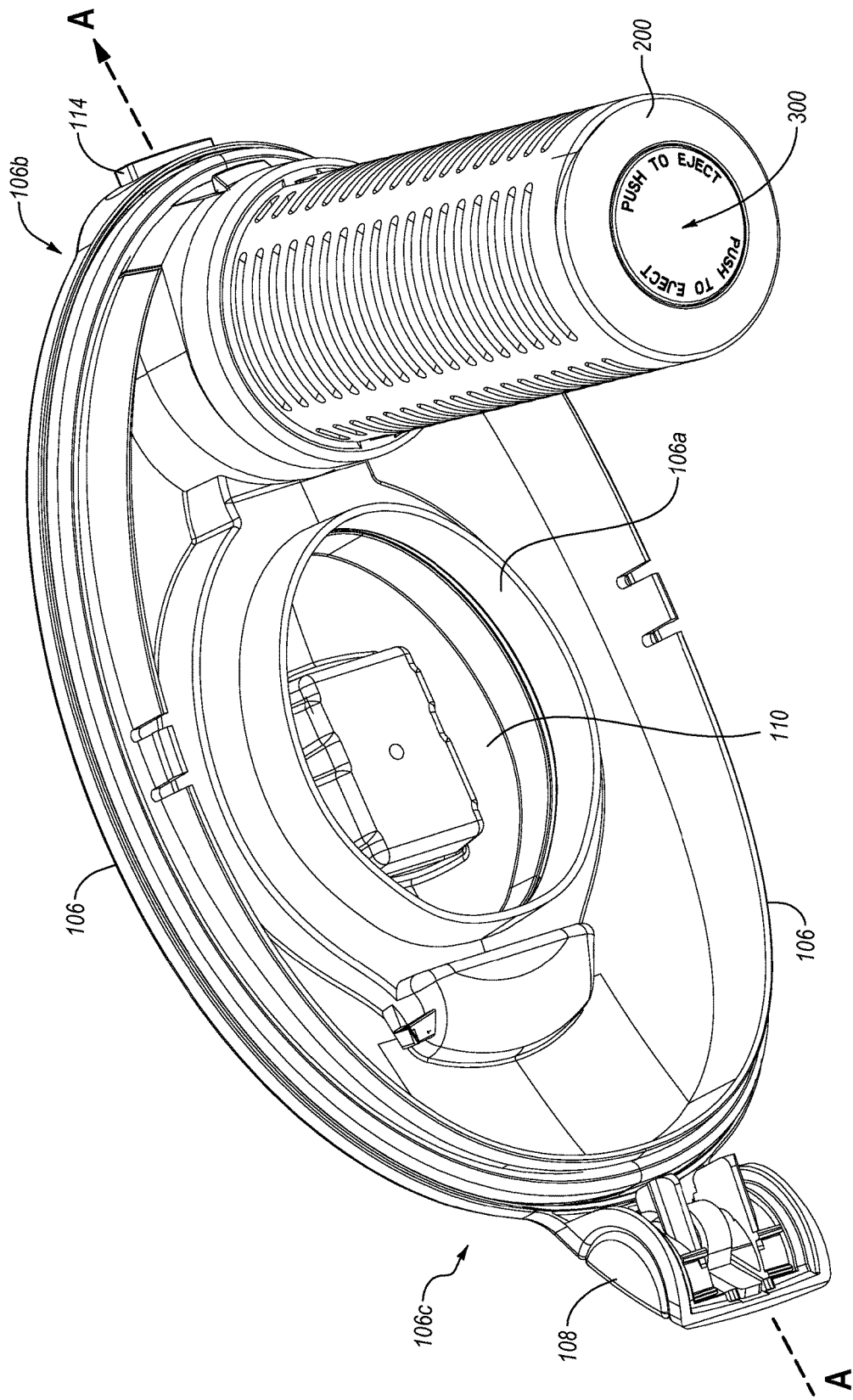
FIG. 2 is a bottom perspective view of an example embodiment of a filter assembly and associated cage attached to a lid.
Figure 3:
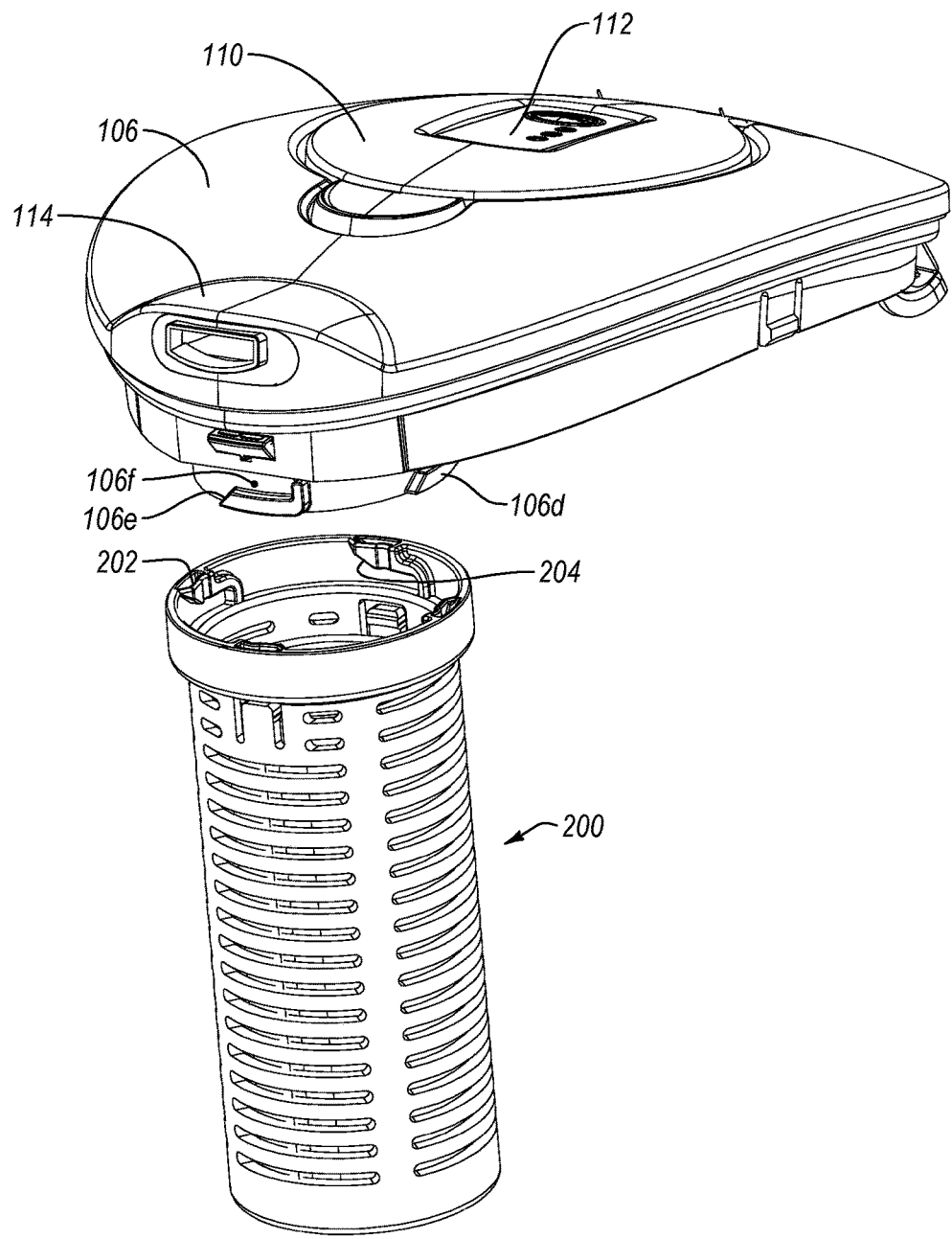
FIG. 3 is an exploded view of the example of FIG. 2.
Figure 4:
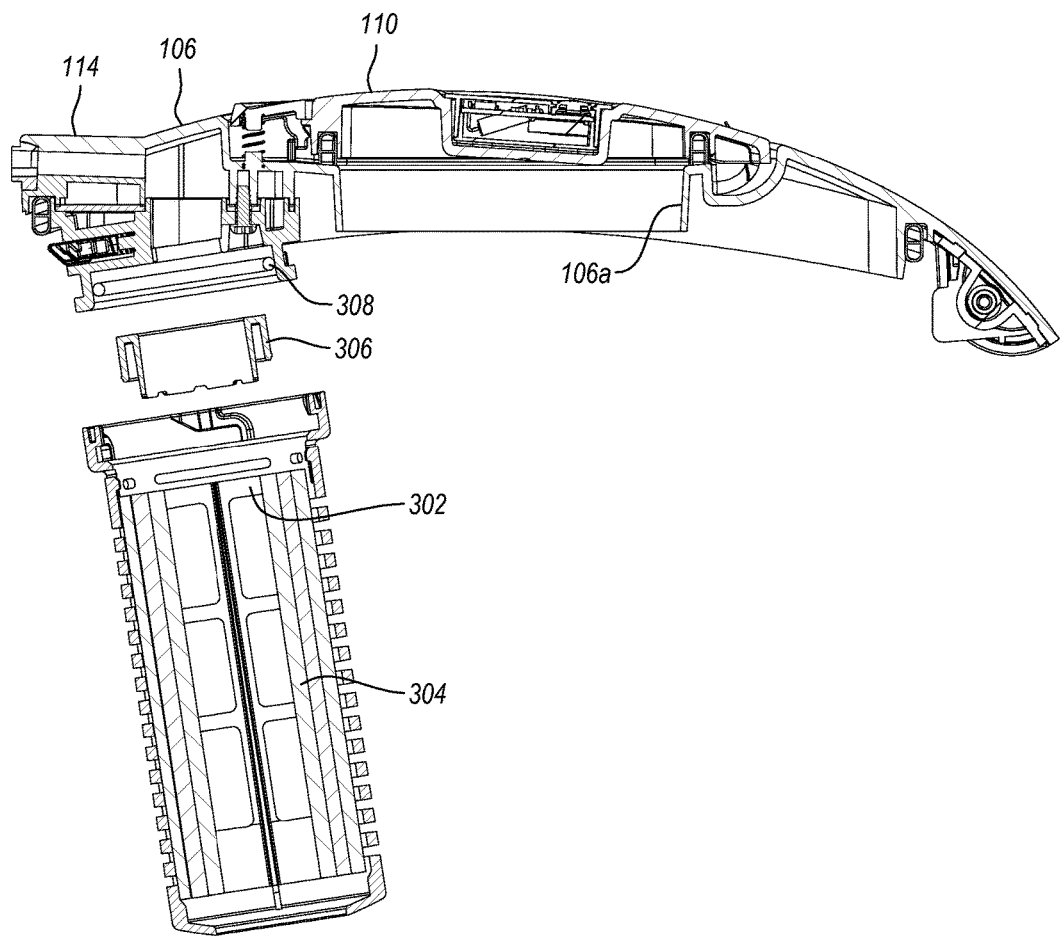
FIG. 4 is a partial exploded section view of an example filter and associated cage including a flow regulator.

Directing attention now to FIGS. 2-4, details are provided concerning some example filter assemblies and filter cages. With reference first to FIG. 2, an example filter cage is denoted at 200, and a filter assembly denoted at 300 is removably positioned in the filter cage 200. In general, and as shown in FIG. 2, the filter cage 200 can be attached to the underside of the cover 106. More particularly, the filter cage 200 of the illustrated embodiment is attached at or near the forward-most end 106b of the cover 106, and distant from the rear-most end 106c of the cover 106. Thus arranged, and with reference to a longitudinal axis AA defined by the cover 106, the filter cage 200 is disposed between the fill opening 106a and the forward-most end 106b, and is located relatively closer to the forward-most end 106b than to the fill opening 106a. As discussed in further detail with regard to FIG. 5, the filter cage 200 may be positioned that a forward-most portion of the filter cage 200 is spaced apart from a forward most edge of the spout 114 a particular distance, or at least within a particular range of distances.

With particular reference now to FIG. 3, and continuing attention to FIGS. 1 and 2, further details are provided concerning the example filter cage 200 and the cover 106. In general, the filter cage 200 can be removably connected to the cover 106 by any suitable mechanism or structure so as to enable a user to periodically remove and replace the filter (see FIGS. 4 and 5) disposed inside the filter cage 200. For example, the filter cage 200 and the cover 106 can each include complementary structures configured to releasably engage the complementary structures of the other. Thus, in the particular example of FIG. 3, the filter cage 200 and the cover 106 are configured with a twist-lock type of configuration which enables a user to lock the filter cage 200 to, and unlock the filter cage 200 from, the cover 106 by rotating the filter cage about 90 degrees clockwise or counter-clockwise, as appropriate.

As shown in FIG. 3, the filter cage 200 includes a plurality of engagement elements 202 configured to interface with a corresponding engagement element 106d of the cover 106. In more detail, the engagement elements 202 each include a ramp 204 configured to slidingly interface with a corresponding ramp 106e of one of the engagement elements 106d. As well, the engagement elements 106d define an open-ended slot 106f configured to removably receive the body of a corresponding engagement element 202. In operation, rotation of the filter cage 200 to an engaged position causes a cam action in which as the ramps 204 move up corresponding ramps 106e, the filter cage 200 moves upward into the cover 106 until the body of each engagement element 202 has reached the limit of its travel within the corresponding slot 106f, at which time the filter cage 200 is fully engaged with the cover 106. The user can remove the filter cage 200 from the cover 106 simply by rotating the filter cage 200 in the direction opposite the direction used to engage the filter cage 200 with the cover 106.

In at least some embodiments, the filter cage 200 and filter assembly 300 are configured and arranged such that when engaged with the cover 106, the fluid path from the filter assembly 300 to the cover 106 and spout 114 is closed, or substantially closed. In this configuration, unfiltered fluid from the reservoir 102 can only enter this fluid path by way of the filter assembly 300. Thus, little or no unfiltered fluid may be dispensed during a dispensing operation.

With continuing reference to FIG. 3, and directing attention now to FIG. 4 as well, further details are provided concerning the filter assembly 300. It should be noted that in at least some embodiments, the filter assembly 300 can be a filter assembly as disclosed in one or more of the 'Related Applications' noted herein, although the scope of the invention is not limited to those embodiments of a filter assembly.

As indicated in FIG. 4, the filter assembly 300 includes a filter core 302 about which is wrapped a filter medium 304, which can take the form of a laminate for example. A core cover 306 is also included that is configured to fit into the filter core 302 and control fluid flow out of the upper end of the filter core 302. Finally, a sealing element 308, such as an O-ring for example, is provided that seals the filter core 302 to the cover 106.

Finally, and as discussed in more detail below in connection with FIG. 5, it can be seen in FIG. 4 that the cover 106 and/or filter assembly 300 can be configured so that when the filter assembly 300 is attached to the cover 106, the filter assembly 300 is disposed at an angle relative to vertical. In the particular example of FIG. 4, the filter assembly 300 is tilted at an angle away from vertical in the range of about 0 degrees to about 30 degrees, although different angles and ranges can alternatively be employed, and the scope of the invention is not limited to any particular orientation of the filter assembly 300.

C. Example Filter Placement Configurations

Figure 5:
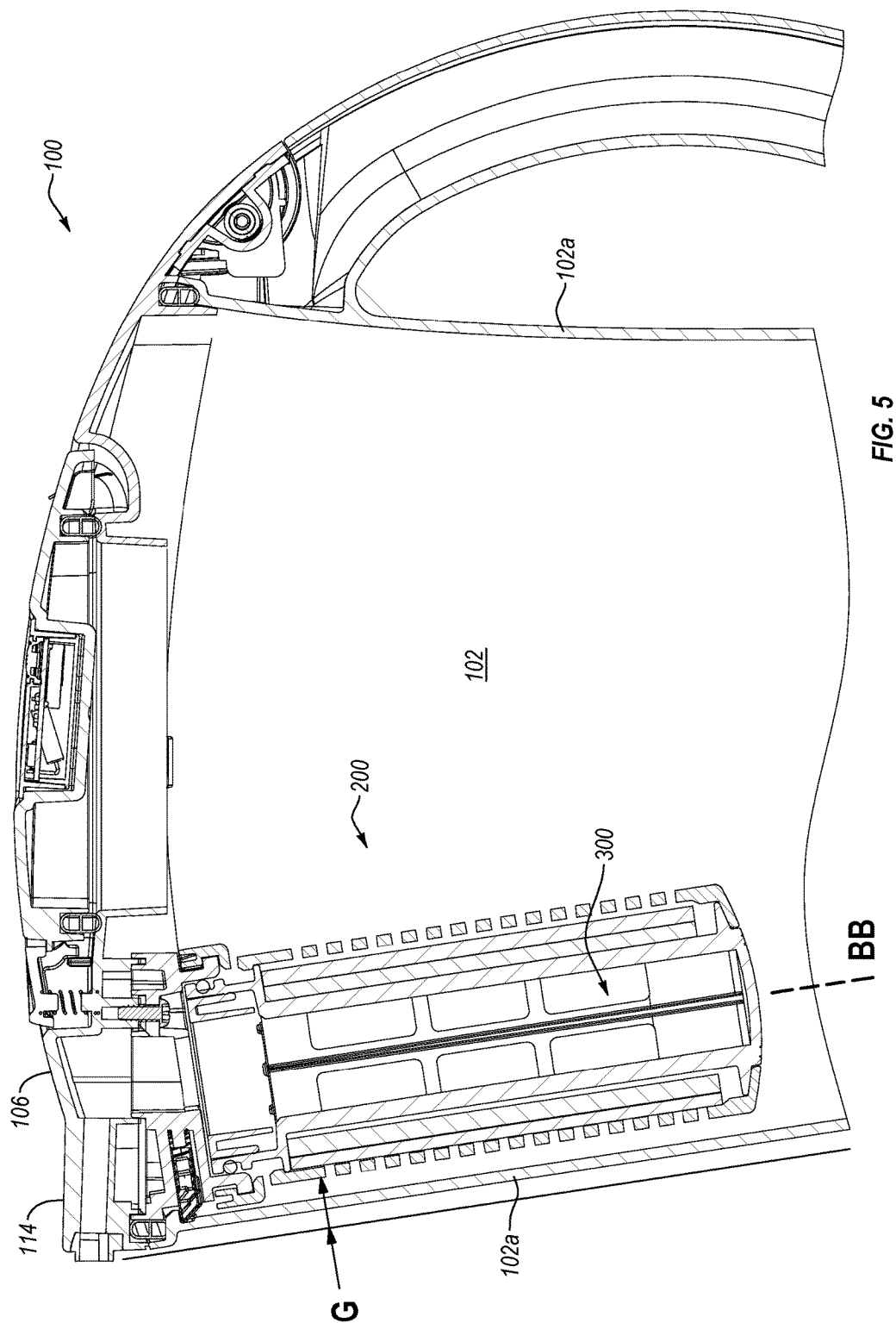
FIG. 5 is a partial section view showing the arrangement of an example filter and cage with respect to a reservoir wall of a fluid container.

Directing attention now to FIG. 5, details are provided concerning some example filter assembly and filter cage placement configurations with respect to a fluid container, such as the fluid container 100. For the purposes of illustration, filter cage 200 and filter assembly 300 are indicated in FIG. 5, although it should be appreciated that other filter cages and/or filter assemblies could alternatively be employed. In the example of FIG. 5, the filter cage 200 and the filter assembly 300 are shown fully engaged with the fluid container 100, particularly, the cover 106. As well, a longitudinal axis BB defined by the filter cage 200 is disposed at an angle away from vertical and/or may be parallel, or non-parallel, with respect to the wall 102a of the fluid container.

In general, and as indicated in FIG. 5, the filter cage 200 can be located substantially closer to a front portion of the wall 102a, that is, a portion of the wall 102a located proximate the spout 114, than to a rear portion of the wall 102a, that is, a portion of the wall 102a located proximate the handle. As such, and disclosed in FIG. 5, at least a portion of the filter cage 200 may be disposed directly beneath the spout 114. Thus, for example, during a dispensing operation in which the fluid container 100 is generally horizontal, the filter cage 200 and filter assembly 300 may be located in a lower third of the reservoir 102.

As shown in FIG. 5, the filter cage 200 is located relatively close to the wall 102a of the fluid container 100. The proximity of the filter cage 200 to the wall 102a can be considered in terms of a gap 'G' that is cooperatively defined by the front edge of the spout 114 and the front edge of the filter cage 200. In at least some embodiments, the gap 'G' is in the range of about 2.0 mm to about 20 mm. In some particular embodiments, the size of the gap 'G' is relatively closer to 2.0 mm than to 20 mm. The width of the gap 'G' may be substantially the same along the length, or a majority of the length, of the gap 'G.' It will be appreciated that a desired spacing between the wall 102a and the front edge of the filter cage 200 can be derived from a range of acceptable values of 'G.'

In some embodiments, gap sizes outside of the aforementioned range may not produce good results. For example, a gap 'G' less than about 2.0 mm can result in scratches or scuffs to the reservoir 102 when the filter cage 200 is installed or removed. On the other hand, a gap 'G' greater than about 20 mm may be accompanied by relatively lower flow rates, an increase in the amount of unfiltered water dispensed, and/or a relatively large amount of unfiltered fluid remaining in the reservoir.

The size of the gap 'G' can be changed in a variety of ways. For example, a relatively larger gap 'G' may be achieved by using a filter cage 200 of relatively smaller diameter. Conversely, a relatively smaller gap 'G' may be achieved by using a filter cage 200 of relatively larger diameter. As another example, the cover 106 can be modified by changing the location and/or orientation of the portion of the cover 106 that interfaces with the filter cage 200. In this way, the location and/or orientation of the filter cage 200 and, accordingly, the size of the gap 'G,' can correspondingly be changed.

It will be appreciated from the present disclosure that determination of the size of the gap 'G' is a non-trivial exercise. Rather, this determination is the outcome of a complex analytical process that must take into account a variety of factors. As noted herein, such factors can include, but are not limited to, the geometry of the filter cage and/or filter assembly, the geometry of the reservoir wall, the geometry of the cover, an acceptable flow rate or range of flow rates, an acceptable amount of unfiltered fluid that can remain in the reservoir after a dispensing process, an acceptable value or range for the amount of fluid that must be filtered in connection with one or more dispensing processes, the hydrostatic head of fluid above the filter assembly during a dispensing operation, and any other factors disclosed or implied herein but not explicitly enumerated here.

As will be further evident from this disclosure, embodiments of the invention may provide a variety of advantages. For example, the fluid container can define a closed, or substantially closed, fluid pathway between a filter and a reservoir outlet. As another example, the fluid container can be configured to implement any one or more of reduction or minimization of the amount of unfiltered water left in the fluid container after a dispensing event, reduction or substantial elimination of bypass around the filter, and achievement of relatively higher flow rates based on hydrostatic pressure at the filter inlet.

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed:

1. A fluid container, comprising:
a reservoir that includes a reservoir wall;
a cover configured to engage the reservoir, and the cover including a spout configured and arranged for fluid communication with the reservoir, wherein the spout is disposed at one end of the cover;
a filter cage configured to releasably engage the cover in a location proximate the spout; and
wherein when the filter cage is fully engaged with the cover, a longitudinal axis defined by the filter cage is tilted away from vertical.

2. The fluid container as recited in claim 1, wherein the fluid container is configured such that, during a dispensing operation, fluid from the reservoir passes through the filter cage and out through the spout.

3. The fluid container as recited in claim 1, wherein when the filter cage is fully engaged with the cover, at least part of the filter cage resides directly below the spout.

4. The fluid container as recited in claim 1, wherein when the filter cage is fully engaged with the cover, a gap is defined between a front edge of the spout and a front edge of the filter cage, and the gap has a width that is equal to or less than about 20 mm.

5. The fluid container as recited in claim 1, wherein when the filter cage is fully engaged with the cover, a longitudinal axis defined by the filter cage is generally parallel to a front wall of the reservoir.

6. A fluid container, comprising:
a reservoir that includes a reservoir wall;
a cover configured to engage the reservoir, and the cover including a spout configured and arranged for fluid communication with the reservoir, wherein the spout is disposed at one end of the cover;
a filter cage configured to releasably engage the cover in a location proximate the spout;
a filter disposed in the filter cage,
wherein a fluid path extending from the reservoir through the filter to the spout is closed or substantially closed; and
wherein the cover defines a fill opening proximate a midpoint of the cover, and the filter cage is removably attachable to the cover at a location between the fill opening and the spout.

7. The fluid container as recited in claim 6, wherein the fluid path is substantially closed such that no, or nearly no, fluid from the reservoir is able to bypass the filter during a dispensing operation.

8. The fluid container as recited in claim 6, further comprising a sealing element by way of which the filter cage is sealed to the cover.

9. The fluid container as recited in claim 6, wherein the fluid container is configured such that, during a dispensing operation, fluid from the reservoir passes through the filter and out through the spout.

10. The fluid container as recited in claim 6, wherein when the filter cage is fully engaged with the cover, a gap is defined between a front edge of the spout and a front edge of the filter cage, and the gap has a width that is in a range of about 2 mm to about 20 mm.

11. The fluid container as recited in claim 10, wherein the width of the gap is closer to 2 mm than to 20 mm.

12. A fluid container, comprising:
a reservoir that includes a reservoir wall;
a cover configured to engage the reservoir, and the cover including a spout configured and arranged for fluid communication with the reservoir, wherein the spout is disposed at one end of the cover;
a filter cage configured to releasably engage the cover in a location proximate the spout, wherein when the filter cage is fully engaged with the cover, a gap is defined between a front edge of the spout and a front edge of the filter cage;
a filter disposed in the filter cage,
a core cover configured to control a fluid flow rate through the filter; and
wherein, during a dispensing operation in which the fluid container is oriented generally horizontally, the filter cage is located below a horizontal line passing at a height equal to one-third of the height of the reservoir whilst in a horizontal orientation.

13. The fluid container as recited in claim 12, wherein the gap has a width that is in a range of about 2 mm to about 20 mm.

14. The fluid container as recited in claim 12, wherein the filter includes a filter medium in the form of a laminate.

15. The fluid container as recited in claim 12, wherein the fluid container is configured such that, during a dispensing operation, fluid from the reservoir passes through the filter and out through the spout.

16. The fluid container as recited in claim 12, wherein when the filter cage is fully engaged with the cover, a longitudinal axis defined by the filter cage is tilted toward the spout away from vertical.

* * * * *